3,227,752
OXIDATION OF ALKYLAROMATIC HYDROCARBONS
Kenneth L. Olivier, Placentia, and William D. Schaeffer, Pomona, Calif., assignors to Union Oil Company of California, Los Angeles, Calif., a corporation of California
Filed May 3, 1962, Ser. No. 192,147
10 Claims. (Cl. 260—524)

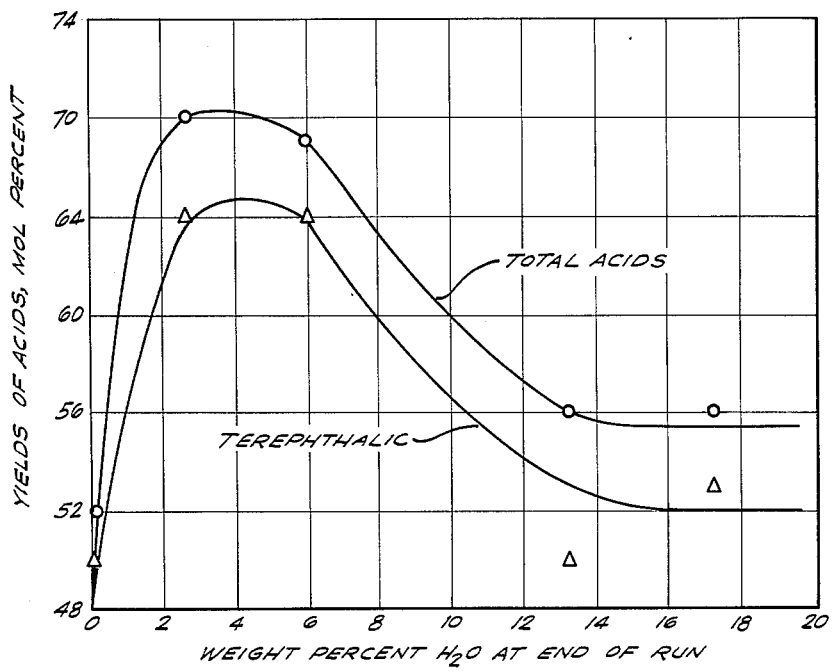
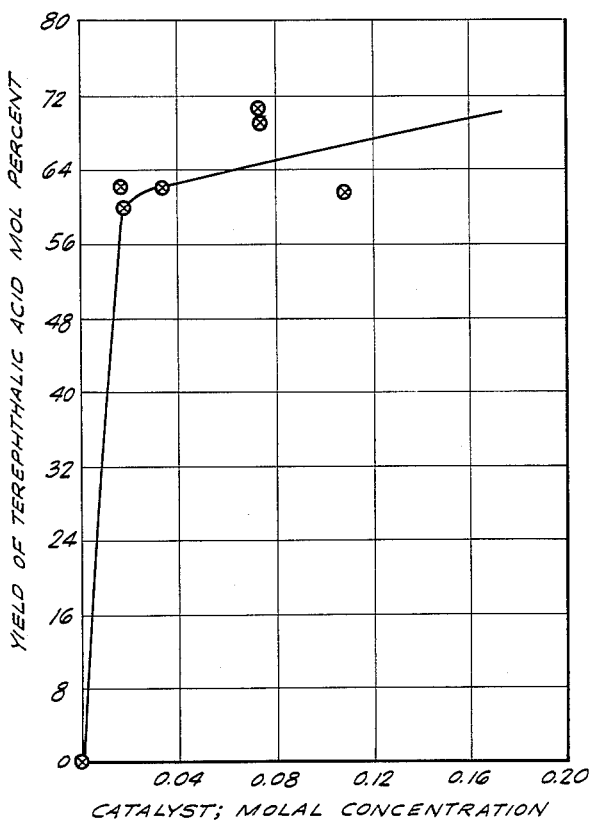
FIG. 2.
FIG. 1.
INVENTOR.
KENNETH L. OLIVIER
WILLIAM D. SCHAEFFER
BY
ATTORNEY

United States Patent Office 3,227,752
Patented Jan. 4, 1966

This invention relates to the oxidation of alkaryl hydrocarbons to polybasic aromatic acids and, in particular, relates to the oxidation of xylenes to phthalic acids.

This invention comprises the oxidation of alkyl groups on an aromatic nucleus with an oxygen containing gas under liquid phase conditions in an inert organic medium and in the presence of a heavy metal catalyst and catalytic amounts of nitric acid.

In a recent patent, 2,839,575, there is described a liquid phase air oxidation of toluic acids to phthalic acids in the presence of a heavy metal catalyst and slight amounts of a —$NO_2$ radical. Nitric acid is stated to be ineffective in the process. The patent also specifies that provision must be made to remove the water formed during the oxidation to maintain anhydrous conditions which are essential to the process.

The need to maintain anhydrous conditions greatly complicates the oxidation. Chemical dehydrating agents which are compatible in the reaction zone are too costly for commercial use and the continuous distillation of water requires use of an elaborate reactor. Furthermore, in the absence of water, ester by-products of the oxidation accumulate in the reaction medium, causing the latter to become viscous and syrupy.

We have now found that a heavy metal and slight amounts of nitric acid will catalyze the oxygen oxidation of alkaryl hydrocarbons and achieve high yields of polybasic acids provided that water is maintained in the reaction zone in excess of a minimal concentration defined hereafter. Not only does water greatly increase the yield of aromatic acids, but its presence in the reaction medium hydrolyzes ester by-products and prevents their accumulation.

Preferably, water is maintained above the minimal limit by retaining the water formed during the oxidation; however, in instances where this amount of water is insufficient, water can be supplied with the reactants.

The charge stock to our oxidation process can be any alkaryl, polyalkaryl, mixtures thereof, or various hydrocarbon distillates or distillate extracts which are rich in alkaryl hydrocarbons. Examples of various alkaryls are: toluene, o-xylene, m-xylene, p-xylene, pseudocumene, mesitylene, hemimellitene, durene, isodurene, pentamethyl benzene, hexamethyl benzene, o-ethyl toluene, p-ethyl toluene, 1,4-diethyl benzene, 2-propyl p-xylene, 4-ethyl o-xylene, cymene, 1,4-diisopropyl benzene, 1-methyl naphthalene, 2-methyl naphthalene, 2,3-dimethyl naphthalene, 2,6-dimethyl naphthalene, 2,7-dimethyl naphthalene, etc., or mixtures thereof. The hydrocarbon charge stock is employed in amounts comprising between about 5 and about 75 weight percent of the total contents in the oxidation zone, preferably in amounts between about 10 and about 50 weight percent.

The product of the oxidation comprises chiefly the corresponding aromatic acid in which all the alkyl groups are oxidized to carboxyl group. Examples of the major products are: benzoic acid, o-phthalic, isophthalic, terephthalic, trimellitic, hemimellitic, mesitoic, pyromellitic, 2,3-naphthalic, 2,6-naphthalic, 2,7-naphthalic acids, etc. Partially oxidized reactants which are also present in the crude product and which can be recycled for complete conversion are: m-toluic, p-toluic, 2-methyl terephthalic, 2,5-dimethyl benzoic, durylic, 6-methyl-2-naphthoic acids, etc.

The temperature of oxidation is generally between about 250° and 500° F., preferably between about 325° and 425° F. The pressure is maintained sufficient to insure liquid phase conditions at the oxidation temperature, generally between about 50 and 1000 p.s.i.g.; preferably between about 200 and 500 p.s.i.g. A sufficient reaction time is provided to attain a high yield of polybasic acids, generally reaction periods between about several minutes to several hours are sufficient. The reaction period depends entirely on the severity of the oxidation, i.e., on the temeprature and oxygen rate as well as the difficulty of the oxidation; it being recognized that the oxidation to phthalic acids is more difficult than to toluic acids or to trimellitic more difficult than to methyl phthalic, etc. In general, the reaction period chosen is sufficient to obtain the maximum yield of polybasic acid. In the manner apparent to those skilled in the art, the necessary reaction time can be determined by following the course of the reaction, e.g., by periodically sampling the reactants and analyzing the samples or by observing the rate of formation of the product, e.g., terephthalic acid separates as a solid product.

The reaction medium comprises an organic liquid which is inert to oxidation and to the catalyst and product. Various organic liquids or mixtures thereof can be used such as various aryls, e.g., benzene, diphenyl, t-butylbenzene; halogenated alkyls and aryls, e.g., chlorobenzene, o-dichlorobenzene, p-difluorobenzene, carbon tetrachloride, ethylene dichloride, trichloropropane; aromatic acids, e.g., benzoic, phthalic; saturated aliphatic acids, e.g., acetic, propionic, butyric, valeric, isovaleric, etc.; or mixtures thereof.

The heavy metal catalyst for the oxidation can be any of the following: manganese, cobalt, nickel, chromium, vanadium, copper, tungsten, tin, cerium, molybdenum, or mixtures thereof. Of these, we prefer cobalt, manganese or mixtures thereof. The catalyst can be employed as a soluble organic or inorganic salt or chelate which is compatible with the reaction conditions. In general, the chloride, sulfates or nitrates of any of the aforementioned metals can be used. The organic salt of various aromatic acids of $C_1$ to $C_{10}$ aliphatic acids can also be used such as the acetate, formate, propionate, butyrate, valerate, benzoate, toluate, terephthalate, naphthenate, salicylate, etc. Preferred salts are those of the aliphatic acids having about 1 to 5 carbons. Chelates of the metals, e.g., the acetyl acetonates, ethylene diamine tetra acetic acid chelates, etc., can also be used.

In general, the catalyst is employed in amounts between about 0.01 and about 0.20 molal concentration; preferably in amounts between about 0.03 and about 0.15 molal concentration. The effect of catalyst concentration is shown in FIGURE 1 where it can be seen that a catalyst concentration greater than 0.01 molal is necessary; greater than about 0.02 molal is preferred.

As previously mentioned, catalytic amounts of nitric acid are employed to accelerate the reaction. In general, it is desired to have a nitric acid concentration in the reaction zone which is between about 0.01 and about 10 weight percent (expressed as 100% $HNO_3$). The effect of nitric acid on the yield of desired product is described in greater detail in Example 2 and Table 1. The preferred amounts of nitric acid supplied to the oxidation comprises between about 1 and 6 weight percent of the total reaction solvent. With nitric acid concentration in these limits, nitro by-products are not formed, in contrast to the substantial yields of nitro contaminates in the product obtained by conventional nitric acid oxidation of polyalkaryls in primarily aqueous solvents.

The nitric acid can be incorporated in the reaction zone by the addition of nitric acid of suitable strength, 25 to 70 percent, or by the addition of nitrogen dioxide. Because water is present in the reaction zone, the nitrogen dioxide so added is free to form nitric acid. The nitric acid or nitrogen dioxide can be added to the reactant charge in a batch oxidation, but, preferably is added continuously either in batch or continuous oxidation processes.

As previously mentioned, it is essential to maintain a minimal water concentration in the reaction zone to obtain aromatic acids in the very high yields of our invention. FIGURE 1, based on the experiments set forth in Example 1, illustrates the effect of water concentration on the yield of acids. Because the water of reaction is retained in the reaction zone, FIGURE 1 represents the conversion as a function of the final water concentration in the reaction zone or in the crude oxidate. It is to be understood, however, that the average water concentration during oxidation is somewhat less.

Because our process employs water in the reaction zone, it has several significant improvements over the methods shown in the prior art. From FIGURE 2, it is apparent that by maintaining a minimal water content in the reaction zone (above about 1 weight percent) we are able to achieve a higher degree of conversion than possible in an anhydrous system.

The presence of water in the reaction zone is also desirable because it prevents the accumulation of ester by-products, since the latter are readily hydrolyzed under the reaction conditions. When the reaction medium is repeatedly used in the oxidation, even the slightest unavoidable yield of ester by-products will ultimately require treatment of the reaction medium for their removal. This treatment, however, is not necessary in our process which employs water in the reaction zone in amounts sufficient to hydrolyze any ester by-products.

In contrast to anhydrous systems advocated by the prior art, our process is greatly simplified since the water of reaction is not removed from the reaction zone. As previously mentioned, use of dehydration agents is not commercially practical and therefore, continuous removal of water is necessary to maintain anhydrous conditions. Because water readily azeotropes with many of the alkaryl reactants, distillation of water directly from the reaction zone is often impossible and extensive hydrocarbon recovery steps must be employed to recover the reactant from the azeotrope for recycling to the reaction zone. Such water removal steps, however, are completely unnecessary in our process which requires the presence of water.

Referring now to FIGURE 2, the preferred water concentration in the reaction zone can be readily determined. In general, water concentrations between about 1 and 25 weight percent are used. The upper limit of water concentration is determined by that amount just insufficient to form a separate aqueous phase, which is undesirable since it would extract the water soluble catalyst salts. Preferably, the water concentration is maintained between about 2 and about 8 weight percent so as to obtain the maximum yield of acid product-amounts in excess of about 60 mol percent.

The oxidation can be conducted batchwise or continuous. In batch operation, the organic medium, heavy metal catalyst, necessary water and alkaryl hydrocarbon can be charged to the reactor, heated to the desired reaction temperature and thereafter contacted with nitric acid and an oxygen containing gas.

In a continuous oxidation, an alkaryl feedstock can be continuously charged to a reactor containing a reaction medium, water, nitric acid and a heavy metal catalyst at the desired temperature and pressure. Air or other oxygen containing gases are introduced into the reactor together with fresh nitric acid, if desired, and the off-gas can be passed to a nitrogen oxide recovery step. The crude product is withdrawn and worked up in a conventional manner, e.g., isophthalic or terephthalic acids can be recovered in a commercialy pure state by centrifuging and washing steps.

Excess water in the reaction medium can be removed by distillation prior to recycling. A bleed stream can be continuously removed from the recycle stream or from the recycle stream or from the reactor to purge the system of any by-products such as phthalic acids, benzoic acids, etc. Fresh catalyst, solvent and nitric acid can be added to the reactor as needed.

Our invention will now be illustrated in the following examples:

EXAMPLE 1

A one-half gallon autoclave was charged with 460 grams of acetic acid, 2 grams of cobaltous acetate tetrahydrate, 2 grams of manganous acetate tetrahydrate and 50 grams of p-xylene. The reactants were heated to 400° F. and thereafter 28 cubic feet per hour of air and 100 milliliters per hour of acetic acid containing 20 volume percent of 70 percent nitric acid were introduced into the liquid. Upon completion of a two-hour reaction period, the autoclave was cooled and the crude product purified. This procedure was repeated for a plurality of determinations at varied final water contents of the reactants.

The conditions and results are depicted in FIGURE 2 where the yield of total acids and yield of terephthalic acid are plotted as a function of the final water content. To obtain a run at substantially anhydrous conditions, the experiment was performed with a reaction medium comprising 300 grams acetic acid and 210 grams acetic anhydride. The yield of total acids and of terephthalic acid obtained was 52 and 49 weight percent, respectively, of the p-xylene charge. In contrast, yields of 70 weight percent (total acids) and 64 weight percent (terephthalic acid) were obtained by retaining the water of reaction so as to obtain a final water concentration of between 2 and 6 weight percent in the product.

EXAMPLE 2

To investigate the effect of nitric acid concentration on the heavy metal-air oxidation process of our invention, a series of experiments similar to those described in Example 1 were performed at increments of nitric acid concentration. The reaction temperature was 400° F.; the reaction period 2 hours; and 2 grams of cobaltous acetate tetrahydrate and 2 grams of manganous acetate tetrahydrate were employed.

The autoclave was initially charged with 400 grams of acetic acid and 50 grams of p-xylene in each experiment. During the oxidation, nitric acid (70% strength) in glacial acetic acid was slowly added. The amounts of acetic and nitric acids so added and the yields of terephthalic acid are presented in the following table.

*Table 1*

| Experiment No. | Solvent Added (milliliters) | Nitric Acid Added (milliliters) | Yield Terephthalic Acid (mol percent) |
|---|---|---|---|
| 1 | 0 | 0 | 0 |
| 2 | 190 | 10 | 44 |
| 3 | 180 | 20 | 42 |
| 4 | 170 | 30 | 54 |
| 5 | 168 | 42 | 64 |

These data establish that the presence of nitric acid is essential to the oxidation, no terephthalic acid being obtained in Experiment 1 which deleted the nitric acid addition. Accordingly, nitric acid should be present in the reaction zone in amounts greater than about 0.01 weight percent; preferably in amounts comprising between about 1 and 6 weight percent of the total reaction medium or solvent.

EXAMPLE 3

To investigate the effect of heavy metal catalyst concentration, a series of experiments were performed in the aforedescribed system at 400° F. for a 2-hour reaction period while continuously supplying nitric acid so as to maintain a nitric acid concentration in the reaction zone above about 0.01 percent. The aggregate amount of nitric acid so added comprised between 3 and 4 weight percent of the reaction solvent. The reaction solvent employed was 600 milliliters of acetic acid. The reaction zone was charged with 50 grams p-xylene in each experiment while the heavy metal catalyst concentration was varied from 0 to about 0.11 molal.

The results are depicetd in FIGURE 1 wherein it can be seen that the catalyst concentration greatly influenced the yield of terephthalic acid and that greater than 0.01 molal concentration is necessary; greater than about 0.02 molal is preferred to effect a high yield of terephthalic acid. The acid product was analyzed by emission spectroscopy and throughout the range of catalyst concentration studied, no cobalt or manganese contamination was observed.

EXAMPLE 4

A series of experiments were performed in the aforedescribed oxidation system during which various alkaryl hydrocarbons were oxidized. For all experiments the autoclave was charged with 400 milliliters of acetic acid and 4 grams of cobaltous acetate tetrahydrate and 4 grams of manganous acetate tetrahydrate. The hydrocarbon was added and the autoclave then heated to reaction temperature. Air was passed through the autoclave for two hours at the reaction temperature and a total of 200 milliliters of acetic acid containing 15 volume percent of 70 percent nitric acid was continuously added over the two-hour period.

The results are presented in the following table:

*Table II*

| CHARGE STOCK | | Temperature, ° F. | Acid Products | Yield, Mole Percent |
|---|---|---|---|---|
| Hydrocarbon | Grams | | | |
| M-xylene | 100 | 400 | Isophthalic | 61 |
| | | | m-Toluic | 19 |
| O-xylene | 100 | 400 | o-Phthalic | 37 |
| | | | o-Toluic | 8 |
| 2,6-Dimethyl naphthalene | 65 | 350 | 2,6-naphthalic | 20 |
| Pseudocumene | 69 | 400 | Trimellitic | 23 |
| | | | Methyl phthalic | 39 |
| | | | Dimethyl benzoic | 14 |
| Toluene | 49 | 400 | Benzoic | 47 |
| P-cymene | 70 | 400 | Terephthalic | 48 |
| | | | p-Toluic | 14 |
| P-toluic acid [1] | | 325 (1 hr.) 375 (1 hr.) | Terephthalic | 79 |

[1] 2 grams of cobaltous acetate and 2 grams of manganous acetate tetrahydrates were used in this experiment.

The preceding examples are intended only to exemplify the process of our invention and are not intended to be unduly restricting of our inventive method comprising the steps recited by the following claims and their apparent equivalents.

We claim:
1. The method of oxidizing an alkaryl hydrocarbon selected from the class consisting of alkylbenzene and alkylnaphthalenes to an aromatic carboxylic acid which comprises: contacting said alkaryl hydrocarbon with oxygen under liquid phase conditions at a temperature between about 250° and about 500° F., a pressure between about 50 and about 1000 p.s.i.g. and sufficient to maintain said liquid phase conditions; said contacting being effected in an inert organic solvent and in the presence of a heavy metal catalyst, selected from the class consisting of manganese, cobalt, nickel, chromium, vanadium, copper, tungsten, tin, cerium, molybdenum and mixtures thereof, nitric acid in an amount between about 0.1 and 10.0 weight percent of said organic solvent, and water in an amount from about 1 to 25 weight percent of said organic solvent.

2. The method of claim 1 wherein said heavy metal catalyst comprises an organic cobalt salt.

3. The method of claim 1 wherein said alkaryl is para xylene and said aromatic acid is terephthalic acid.

4. The method of claim 1 wherein said alkaryl is meta xylene and said aromatic acid is isophthalic acid.

5. The method of claim 1 wherein the water formed by the oxidation is retained in the oxidation zone as water of dilution and the crude oxidation product has a water content between about 2 and about 8 weight percent.

6. The method for preparation of a phthalic acid which comprises contacting xylene with an elemental oxygen-containing gas in the presence of a reaction medium comprising an aliphatic acid having between 1 and 6 carbons at a temperature between about 325° and 425° F. and a pressure between about 200 and 500 p.s.i.g., sufficient to maintain a liquid phase; said reaction meduim containing between about 0.01 and 0.20 molal concentration of a soluble organic salt of a heavy metal selected from the class consisting of manganese, cobalt, nickel, chromium, vanadium, copper, tungsten, tin, cerium, molybdenum and mixture thereof, between about 0.01 and 10 weight percent nitric acid based on said aliphatic acid and from about 1 to 25 weight percent of water based on said aliphatic acid.

7. The method of claim 1 wherein said heavy metal catalyst comprises an organic manganese salt.

8. The method of claim 6 wherein said heavy metal catalyst comprises a mixture of organic cobalt and manganese salts.

9. The method of claim 6 wherein said heavy metal catalyst comprises an organic manganese salt.

10. The method of claim 6 wherein said water is present in amounts from 2 to about 8 weight percent of said aliphatic acid.

References Cited by the Examiner
UNITED STATES PATENTS

| | | | |
|---|---|---|---|
| 2,673,217 | 3/1954 | Hull | 260—524 |
| 2,813,119 | 11/1957 | Taves | 260—524 |
| 2,815,373 | 12/1957 | Mayurnik | 260—524 |
| 2,839,575 | 6/1958 | Fetterly | 260—524 |
| 2,952,703 | 9/1960 | McKeever et al. | 260—523 |
| 3,030,413 | 4/1962 | Taves | 260—524 |

LORRAINE A. WEINBERGEN, *Primary Examiner.*

LEON ZITVER, *Examiner.*